(12) United States Patent
Nakamura

(10) Patent No.: US 9,007,515 B2
(45) Date of Patent: Apr. 14, 2015

(54) LENS-INTERCHANGEABLE CAMERA SYSTEM, LENS DATA TRANSMISSION METHOD AND LENS DATA ACQUISITION PROGRAM

(71) Applicant: Sony Corporation, Tokyo (JP)

(72) Inventor: Makibi Nakamura, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/874,704

(22) Filed: May 1, 2013

(65) Prior Publication Data

US 2013/0300920 A1    Nov. 14, 2013

(30) Foreign Application Priority Data

May 8, 2012    (JP) .................................. 2012-106379

(51) Int. Cl.
| | | |
|---|---|---|
| H04N 5/225 | (2006.01) | |
| H04N 9/73 | (2006.01) | |
| H04N 5/235 | (2006.01) | |
| H04N 5/232 | (2006.01) | |
| G03B 17/14 | (2006.01) | |

(52) U.S. Cl.
CPC ......... *H04N 5/2254* (2013.01); *H04N 5/23209* (2013.01); *H04N 5/23212* (2013.01); *G03B 17/14* (2013.01); *G03B 2206/00* (2013.01)

(58) Field of Classification Search
None
See application file for complete search history.

(56) References Cited

U.S. PATENT DOCUMENTS

| | | | |
|---|---|---|---|
| 2002/0135693 A1* | 9/2002 | Ohkawara et al. | 348/347 |
| 2011/0200313 A1* | 8/2011 | Tamura | 396/91 |
| 2011/0243539 A1* | 10/2011 | Nakamura | 396/80 |
| 2012/0086835 A1* | 4/2012 | Matsuzaka | 348/240.99 |
| 2012/0133821 A1* | 5/2012 | Takaiwa | 348/345 |

FOREIGN PATENT DOCUMENTS

JP    2010-237515 A    10/2010

* cited by examiner

*Primary Examiner* — Lin Ye
*Assistant Examiner* — John H Morehead, III
(74) *Attorney, Agent, or Firm* — Lerner, David, Littenberg, Krumholz & Mentlik, LLP

(57) ABSTRACT

A lens-interchangeable camera system includes: an interchangeable lens unit storing lens characteristic data corresponding to parameters of lenses in a discrete manner; and a camera body unit to which the lens characteristic data is transmitted from the interchangeable lens unit when the interchangeable lens unit is mounted. The camera body unit includes an acquisition data storage unit storing the transmitted lens characteristic data, a closest data acquisition processing unit, a close data acquisition processing unit, and an unacquired data acquisition processing unit. Processing is performed in the order from the closest data acquisition processing unit, the close data acquisition processing unit and the unacquired data acquisition processing unit.

10 Claims, 12 Drawing Sheets

LENS-INTERCHANGEABLE CAMERA SYSTEM, LENS DATA TRANSMISSION METHOD AND LENS DATA ACQUISITION PROGRAM

CROSS-REFERENCE TO RELATED APPLICATION

The present application claims priority from Japanese Patent Application No. JP 2012-106379 filed in the Japanese Patent Office on May 8, 2012, the entire content of which is incorporated herein by reference.

FIELD

The present disclosure relates to a lens-interchangeable camera system, a lens data transmission method and a lens data acquisition program. Particularly, the present disclosure relates to a technology of transmitting lens characteristic data held by an interchangeable lens unit to a camera body unit when the interchangeable lens unit is mounted on the camera body unit in a lens-interchangeable digital still camera or a digital video camera.

BACKGROUND

In the lens-interchangeable digital camera, as the interchangeable lens unit to be attached to the camera body unit has lens characteristics peculiar to each lens unit, lens characteristic data of the interchangeable lens unit is transmitted to the camera body unit in advance when using the interchangeable lens unit. In the camera body unit, the transmitted lens characteristic data of the interchangeable lens unit is used as correction data when image processing is performed to an image signal taken in an imaging unit. Accordingly, it is difficult to allow the camera to take an image until the transmission of all lens characteristic data of the interchangeable lens unit is completed at the time of activating the camera and other occasions, therefore, a great photo opportunity coming just after the change of the interchangeable lens unit may be missed.

In response to the above, a technique is known (for example, refer to JP-A-2010-237515 (Patent Document 1)), in which lens characteristic data transmitted once is stored with a lens identifier and the lens characteristic data is not retransmitted when the interchangeable lens unit having the same identifier is attached. Accordingly, in the case where the changed interchangeable lens unit has been used before, transmission of lens characteristic data performed just after the change can be omitted, therefore, it is possible to shorten a period of time until the camera is ready to take an image and it is possible to take an image just after changing the lens.

SUMMARY

However, even when the period of time from the lens change until the camera is ready to take an image can be shortened, all lens characteristic data have to be transmitted at least in the first lens change. Additionally, as a capacity of a memory to be mounted on the camera body unit is limited, there is also a limit on the number of the interchangeable lens units which can store enormous lens characteristic data.

In view of the above, it is desirable to provide a lens-interchangeable camera system, a lens data transmission method and a lens data acquisition program capable of shortening a period of time from activation of the camera or lens change until the camera is ready to take an image.

An embodiment of the present disclosure is directed to a lens-interchangeable camera system including an interchangeable lens unit storing lens characteristic data corresponding to parameters of lenses in a discrete manner, and a camera body unit to which the lens characteristic data is transmitted from the interchangeable lens unit when the interchangeable lens unit is mounted, in which the camera body unit has an acquisition data storage unit storing the transmitted lens characteristic data, a closest data acquisition processing unit receiving present parameter position information of the interchangeable lens unit, calculating the closest parameter position of the discrete lens characteristic data which is closest to the present parameter position and requesting the interchangeable lens unit to acquire corresponding lens characteristic data, a close data acquisition processing unit calculating close parameter positions existing close to the closest parameter position and requesting the interchangeable lens unit to acquire corresponding lens characteristic data, and an unacquired data acquisition processing unit calculating unacquired parameter positions which have not been acquired and requesting the interchangeable lens unit to acquire corresponding lens characteristic data, and processing is performed in the order from the closest data acquisition processing unit, the close data acquisition processing unit and the unacquired data acquisition processing unit.

Another embodiment of the present disclosure is directed to a lens data transmission method including transmitting lens characteristic data existing closer to a lens position based on present lens position information notified by an interchangeable lens unit when transmitting the lens characteristic data of the interchangeable lens unit to a camera body unit after the interchangeable lens unit is mounted on the camera body unit.

Still another embodiment of the present disclosure is directed to a lens data acquisition program allowing a computer to execute processing including receiving present parameter position information of an interchangeable lens unit, calculating the closest parameter position of discrete lens characteristic data which is closest to the present parameter position and requesting the interchangeable lens unit to acquire corresponding lens characteristic data, calculating close parameter positions existing close to the closest parameter position and requesting the interchangeable lens unit to acquire corresponding lens characteristic data, and calculating unacquired parameter positions which have not been acquired and requesting the interchangeable lens unit to acquire corresponding lens characteristic data.

According to the embodiments of the present disclosure, the transmission of lens characteristic data performed at the time of activating the camera or changing the lens is performed from data existing close to the parameter position of the lens, therefore, the camera becomes ready to take an image at the same parameter position just after the camera activation or the change of the lens.

DETAILED DESCRIPTION

Hereinafter, an embodiment of the present disclosure will be explained by citing a case of an interchangeable digital still camera with reference to the drawings.

Figure 1:
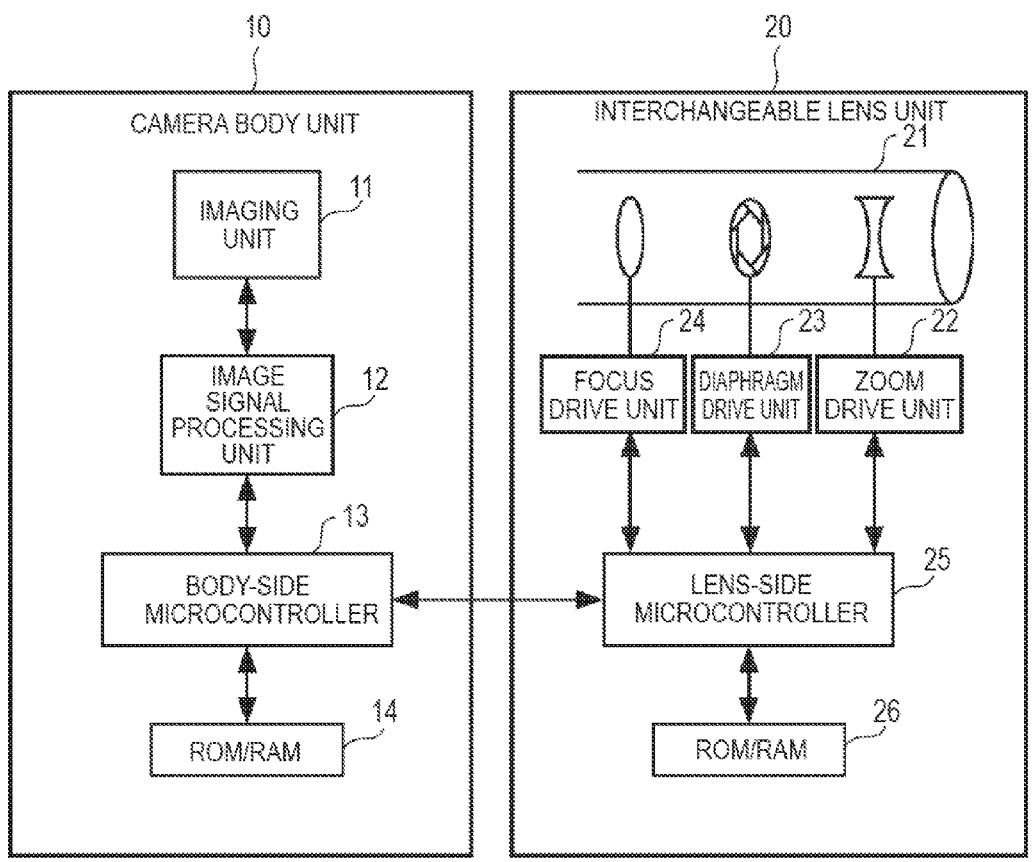
FIG. 1 is a system configuration diagram showing an outline of a lens-interchangeable camera system according to an embodiment of the present disclosure.
Figure 2:
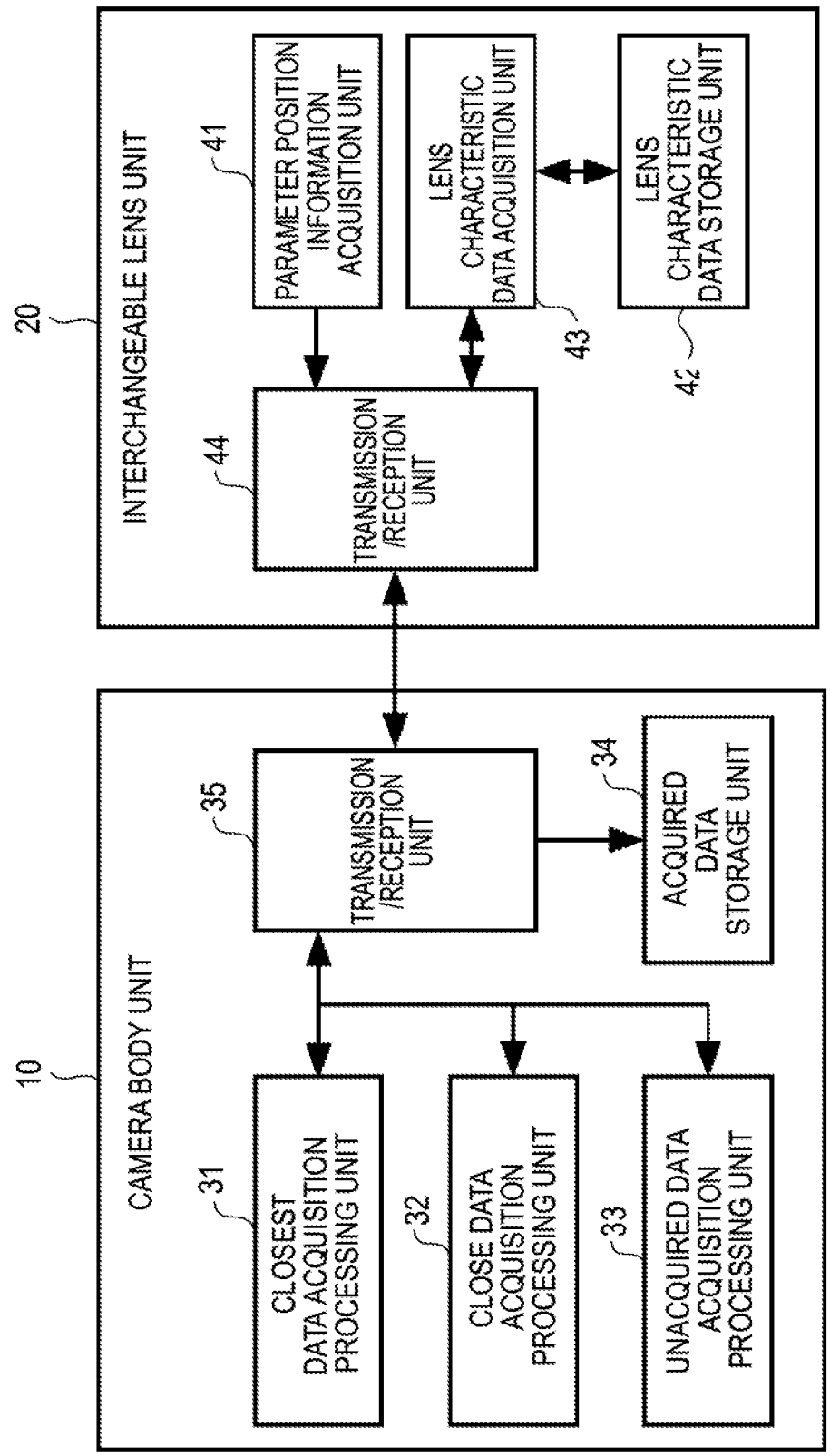
FIG. 2 is a block diagram showing functions of the lens-interchangeable camera system according to the embodiment of the present disclosure.
Figure 3:
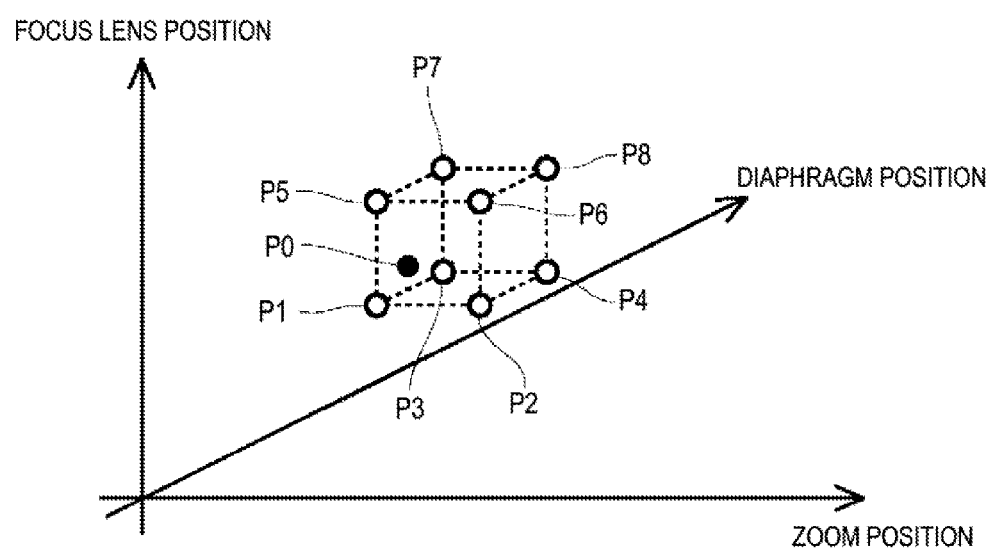
FIG. 3 is an explanatory view showing parameter positions of an interchangeable lens unit.

FIG. 1 is a system configuration diagram showing an outline of a lens-interchangeable camera system according to the embodiment of the present disclosure, FIG. 2 is a block diagram showing functions of the lens-interchangeable camera system according to the embodiment of the present disclosure and FIG. 3 is an explanatory view showing parameter positions of an interchangeable lens unit.

The lens-interchangeable camera system according to the embodiment of the present disclosure includes a camera body unit 10 and an interchangeable lens unit 20 as shown in FIG. 1. The camera body unit 10 includes an imaging unit 11, an image signal acquisition processing unit 12, a body-side microcontroller 13 and a memory 14.

The imaging unit 11 converts an image of an object into an electrical image signal, which is formed by a CCD (Charge Coupled Device) imaging device or a CMOS (Complementary Metal Semiconductor) imaging device.

The image signal acquisition processing unit 12 performs various correction processing to the electrical image signal outputted by the imaging unit 11 based on peculiar lens characteristics data included in the interchangeable lens unit 20.

The body-side microcontroller 13 includes a CPU (Central Processing Unit), a transceiver unit and so on, controlling the entire camera body unit 10 as well as performing communication control with respect to the interchangeable lens unit 20.

The memory 14 includes a ROM (Read Only Memory) and a RAM (Random Access Memory). In the ROM, OS (Operating System) programs, various application programs including a lens data acquisition program and so on are stored. In the RAM, at least part of OS programs and application programs to be executed by the CPU is temporarily stored, and further, various data necessary for processing by the CPU and lens characteristic data acquired from the interchangeable lens unit 20 are also temporarily stored.

The interchangeable lens unit 20 has an optical unit 21 including various types of lenses and a diaphragm mechanism, a zoom drive unit 22, a diaphragm drive unit 23, a focus drive unit 24, a lens-side microcontroller 25 and a memory 26.

The zoom drive unit 22, the diaphragm drive unit 23 and the focus drive unit 24 have information of parameter positions such as a zoom position, a diaphragm position and a focus lens position where the camera body unit 10 is placed at present, outputting these information as present parameter position information.

The lens-side microcontroller 25 includes a CPU, a transceiver unit and so on, controlling the entire the interchangeable lens unit 20 as well as performing communication control with respect to the camera body unit 10.

The memory unit 14 has the ROM and the RAM. In the ROM, OS programs, application programs for controlling the zoom drive unit 22, the diaphragm drive unit 23 and the focus drive unit 24 and for transmitting present parameter position information and so on are stored. In the RAM, at least part of OS programs and application programs executed by the CPU is temporarily stored, and further, various data necessary for processing by the CPU is also temporarily stored.

Processing functions in the embodiment included in the lens interchangeable camera system according to the embodiment can be realized by a hardware configuration described above. Next, a specific example of the processing functions in the embodiment will be explained in detail with reference to FIG. 2.

The camera body unit 10 includes, as functions thereof, a closest data acquisition processing unit 31, a close data acquisition processing unit 32, an unacquired data acquisition processing unit 33, an acquired data storage unit 34 and a transmission/reception unit 35.

The closest data acquisition processing unit 31 has a function of calculating a closest parameter position which is closest to present parameter position information received from the interchangeable lens unit 20 and requesting the interchangeable unit 20 to acquire lens characteristic data corresponding to the closest parameter position.

The close data acquisition processing unit 32 has a function of calculating close parameter positions existing close to the present parameter position information including the closest parameter position and requesting the interchangeable lens unit 20 to acquire lens characteristic data corresponding to the close parameter positions. The close data acquisition processing unit 32 performs processing after the closest data acquisition processing unit 31 performs processing. Accordingly, when the close data acquisition processing unit 32 transmits close parameter positions to the interchangeable lens unit 20, the closest parameter position is excluded from close parameter positions data acquisition of which is requested.

The unacquired data acquisition processing unit 33 has a function of calculating unacquired acquisition parameter positions which have not been acquired and requesting the interchangeable lens unit 20 to acquire lens characteristic data corresponding to the unacquired parameter positions. The unacquired data acquisition processing unit 33 performs processing after the close data acquisition processing unit 32 performs processing. The unacquired data is acquired in order from a reference position which is suitably provided in the lens characteristic data. As the unacquired data does not have to be acquired urgently unless the present parameter position is changed, acquisition may be started from any position in the lens characteristic data, and the acquisition may be performed at random in some cases.

The acquired data storage unit 34 has a function of storing lens characteristic data transmitted from the interchangeable lens unit 20. The lens characteristic data stored in the acquired data storage unit 34 is used as correction data for performing correction processing corresponding to lens characteristics of the interchangeable lens unit 20 when the image signal acquisition processing unit 12 performs image processing with respect to an image signal taken by the imaging unit 11.

The transmission/reception unit 35 has a function of transmitting and receiving parameter positions of unacquired lens characteristic data necessary for the camera body unit 10, present parameter position information of the interchangeable lens unit 20 and lens characteristic data corresponding to the parameter position with respect to the interchangeable lens unit 20.

On the other hand, the interchangeable lens unit 20 includes, as functions thereof, a parameter position information acquisition unit 41, a lens characteristic data storage unit 42, a lens characteristic data acquisition unit 43 and a transmission/reception unit 44.

The parameter position information acquisition unit 41 has a function of acquiring information of a present zoom position, a diaphragm position and a focus lens position as the present parameter position information of the interchangeable lens unit 20 and notifying the camera body unit 10 of the information through the transmission/reception unit 44. The present parameter position information is acquired when the interchangeable lens unit 20 is mounted on the camera body unit 10 at the time of activating the camera and when the zoom position is changed during data transmission.

The lens characteristic data storage unit 42 has a function of storing lens characteristic data of the interchangeable lens unit 20. The lens characteristic data is the entire information varying according to the lens position and can be used in camera control. The lens characteristic data is fixed data indicating lens characteristics, which are, for example, physical characteristics such as a focal length of an interchangeable lens unit 20 and optical characteristics such as lens aberration information, exit pupil information and shading information. The lens characteristic information may also include lens design information of the interchangeable lens unit 20 and optical information calculated from the information, which enables further correction on the camera body unit 10 and enables addition of a new function. The lens characteristic information may further include information calculated from the lens design information which is necessary for an autofocus function, which realizes high-speed and highly accurate autofocus by transmitting the information to the camera body unit 10.

The lens characteristic data acquisition unit 43 has a function of searching a parameter position notified by the camera body unit 10 with respect to the lens characteristic data storage unit 42 and acquiring lens characteristic data corresponding to the parameter position from the lens characteristic data storage unit 42.

The transmission/reception unit 44 has a function of transmitting and receiving parameter positions of unacquired lens characteristic data necessary for the camera body unit 10, present parameter position information of the interchangeable lens unit 20 and lens characteristic data corresponding to the parameter position with respect to the camera body unit 10.

According to the lens-interchangeable camera system having the above functions, the camera body unit 10 includes the closest data acquisition processing unit 31. Accordingly, it is possible to preferentially acquire lens characteristic data corresponding to the closest parameter position which is closest to the parameter position when the interchangeable lens unit 20 is mounted on the camera body 10. The lens characteristic data corresponding to the closest parameter position is not optimum data as correction data. However, only the lens characteristic data of the closest parameter position is acquired at least from the present parameter position and the camera is ready to take an image, therefore, the imaging can be started immediately. Accordingly, when a scene desired to be imaged suddenly comes just after the interchangeable lens unit 20 is mounted on the camera body 10, it is possible to perform imaging almost without waiting. Additionally, the taken image is corrected by lens characteristic data at the closest parameter position in image processing, therefore, an image in a sufficiently close to a perfect state can be obtained though not in a completely perfect state.

Here, as the parameter position of the interchangeable lens portion 20, the zoom position, the diaphragm position and the focus lens position are associated with one another, the lens characteristic data includes discrete rough values in respective variation ranges of the zoom position, the diaphragm position and the focus lens position. Accordingly, the parameter position of the interchangeable lens unit 20 can be expressed by the relationship of the zoom position, the diaphragm position and the focus lens position in a three-dimensional space as shown in FIG. 3.

Here, when the present parameter position information notified from the interchangeable lens unit 20 is a parameter position P0, lens characteristic data necessary for image processing of the camera body unit 10 will be data of neighboring eight parameter positions P1 to P8 existing close to one another. In the camera body unit 10, interpolation processing is performed to these neighboring eight lens characteristic data to calculate lens characteristic data in the parameter position P0 to be used for image processing.

In the lens-interchangeable camera system according to the embodiment, lens characteristic data corresponding to the closest parameter position of the present parameter position P0, namely, the parameter position P1 in the example of FIG. 3 is preferentially acquired. Accordingly, image processing by using the lens characteristic data of the closest parameter position P1 is possible even when the imaging is performed just after the camera becomes ready to take an image.

The specific flow of transmission processing of lens characteristic data in the lens-interchangeable camera system will be explained below. In the explanation, the parameter position is explained by two-dimensional expression not three-dimensional expression in FIG. 3 for avoiding complication of the drawing.

Figure 4:
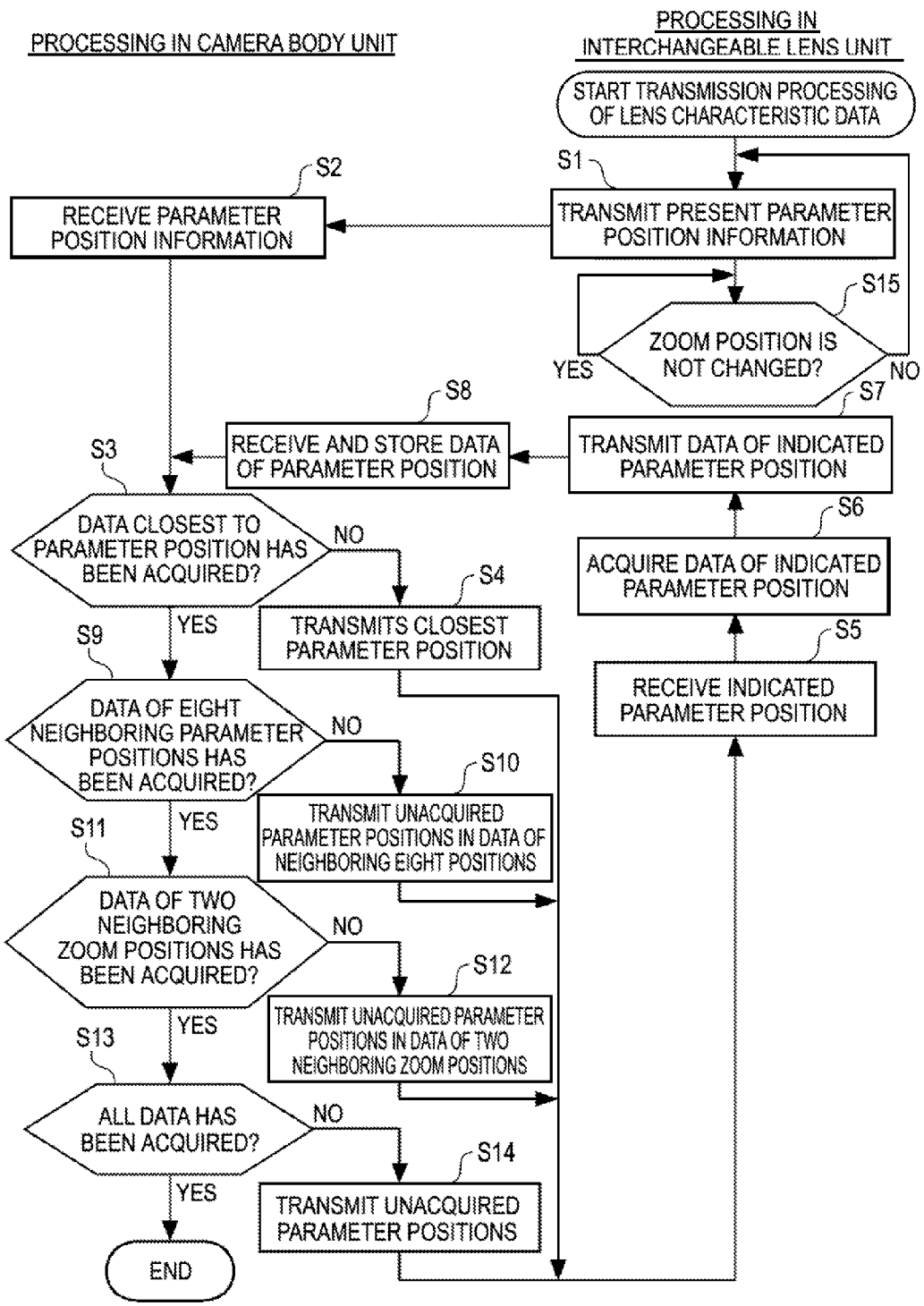
FIG. 4 is a flowchart showing the flow of transmission processing of lens characteristic data in the lens-interchangeable camera system.
Figure 5:
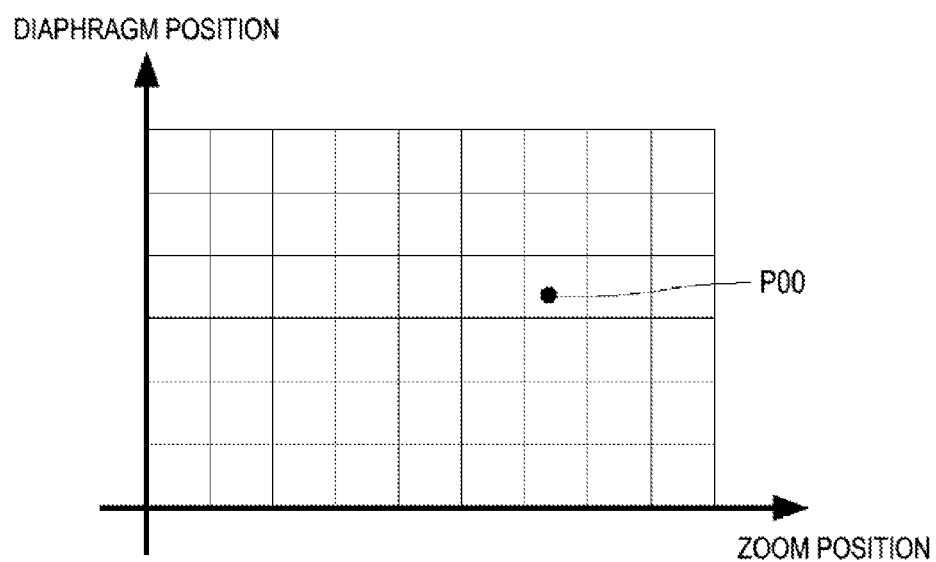
FIG. 5 is an explanatory view showing a present parameter position.

FIG. 4 is a flowchart showing the flow of transmission processing of lens characteristic data in the lens-interchangeable camera system, and FIG. 5 to FIG. 12 are explanatory views explaining acquisition procedures of lens characteristic data. In the flowchart of FIG. 4, processing of the camera body unit 10 is shown on the left side and processing of the interchangeable lens unit 20 is shown on the right side.

The transmission processing of data characteristic data is started when the camera system is activated or when the interchangeable lens unit 20 is mounted on the camera body unit 10. First, in the interchangeable lens unit 20, the lens-side microcontroller 25 transmits present parameter position information to the camera body unit 10 (Step S1). Assume that the present parameter position information in this case indicates a parameter position P00 in parameter positions shown by two-dimensional space formed by the zoom position and the diaphragm position shown in FIG. 5.

Figure 6:
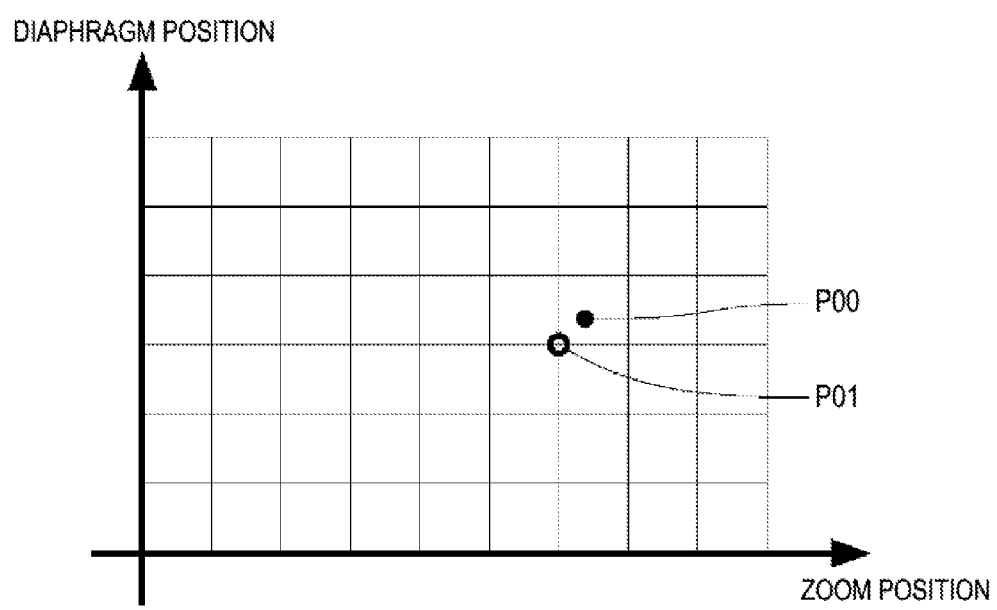
FIG. 6 is an explanatory view showing the calculated closest parameter position.
Figure 7:
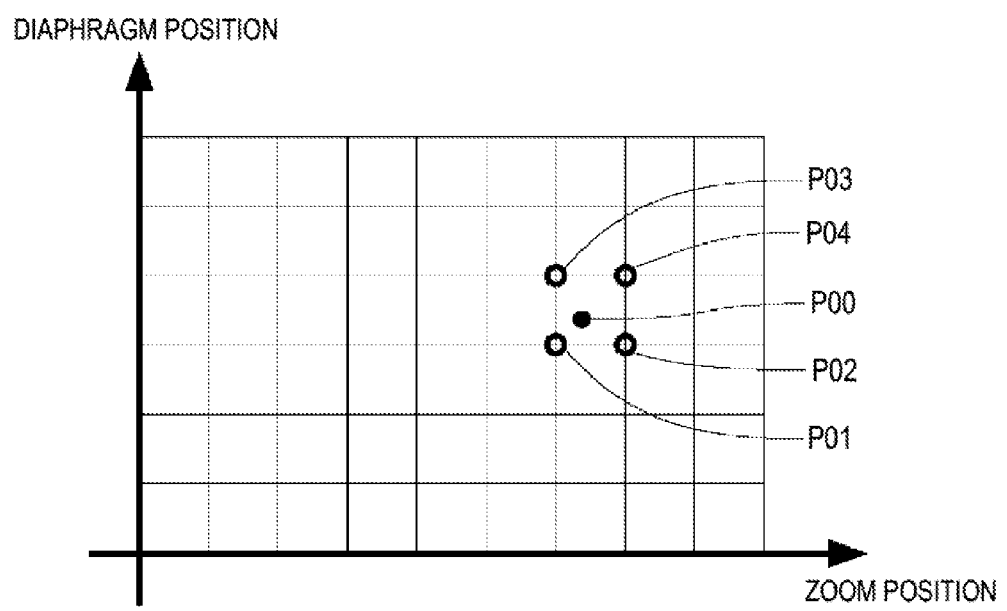
FIG. 7 is an explanatory view showing calculated close parameter positions.

Next, the body-side microcontroller 13 receives the present parameter position information from the interchangeable unit 20 (Step S2). Then, the body-side microcontroller 13 calculates a parameter position closest to the position indicated by the present parameter position information and determines whether lens characteristic data corresponding to the position has been acquired or not (Step S3). Assume that the closest parameter position calculated at this time is a closest parameter position P01 on lattice points, for example, as shown in FIG. 6. Here, when lens characteristic data of the closest parameter position P01 has not been acquired, the body-side microcontroller 13 transmits the closest parameter position P01 to the interchangeable lens unit 20 (Step S4).

In the interchangeable lens unit 20, the lens-side microcontroller 25 receives the parameter position indicated by the camera body unit 10 (Step S5) and acquires lens characteristic data corresponding to the indicated parameter position (Step S6). Next, the lens-side microcontroller 25 transmits the acquired lens characteristic data to the camera body unit 10 (Step S7).

In the camera body unit 10, the body-side microcontroller 13 receives lens characteristic data corresponding to the transmitted parameter position and stores the lens characteristic data in the memory 14 (Step S8). Accordingly, as the camera body 10 acquires lens characteristic data corresponding to the closest parameter position P01 which is closest to the present parameter position of the interchangeable lens unit 20, namely, minimum data necessary for imaging, the lens-interchangeable camera system becomes ready to take an image.

When the lens characteristic data of the closest parameter position P01 has been acquired in Step S3, the body-side microcontroller 13 calculates parameter positions existing close to the present parameter position and determines whether these data has been acquired or not (Step S9). The neighboring parameter positions existing close to the present parameter position calculated at this time are close positions P01 to P04, for example, shown in FIG. 7. Though the number of the neighboring parameter positions existing close to the present parameter position is four in FIG. 7, there are actually further four neighboring parameter positions in the direction of the focus lens position, the number of parameter positions existing close to the present parameter position information is eight. Here, when lens characteristic data of the close parameter positions P01 to P04 has not been acquired, the body-side microcontroller 13 transmits the close parameter positions P01 to P04 to the interchangeable lens unit 20 (Step S10). However, data of at least one position in eight positions has been acquired, therefore, only parameter positions data of which has not been acquired are transmitted here.

When lens characteristic data of eight close parameter positions has been acquired in Step S9, the body-side microcontroller 13 acquires lens characteristic data corresponding to remaining parameter positions data of which has not been acquired.

In the embodiment, first, close parameter positions adjacent in front and back in the zoom position direction sandwiching the present parameter position are fixed, and lens characteristic data of the entire area corresponding to diaphragm positions and focus lens positions relating to the close parameter positions is preferentially acquired. This is based on a request that lens characteristic data of the entire area corresponding to diaphragm positions and focus lens positions is desired to be acquired as soon as possible for responding to the system in which the diaphragm position and the focus lens position suddenly change at the moment of pressing a shutter button. This is also based on a request that normal data of the closest parameter position is desired to be used, not a temporary data, whenever the shutter button is pressed as the diaphragm position and the focus lens position are constantly moved when the autofocus is set. On the other hand, as the zoom position does not move unless being operated by a person taking an image, the priority at the time of acquiring lens characteristic data with respect to zooming is lower than the case of the diaphragm position and the focus lens position.

That is, the body-side microcontroller 13 calculates parameter positions of diaphragm positions and focus lens positions sequentially from a reference position while fixing two points of zoom positions and determines whether data of these parameter positions has been acquired or not (Step S11). Here, the reference position of the diaphragm position may be, for example, an opened position of the diaphragm, and a reference position of the focus lens position may be, for example, an infinity focus position. These reference positions are set for convenience, and may be set anywhere as long as they are set in a two-dimensional plane in a fixed zoom position including the diaphragm position and the focus lens position. The order of calculation can be also at random.

Figure 8:
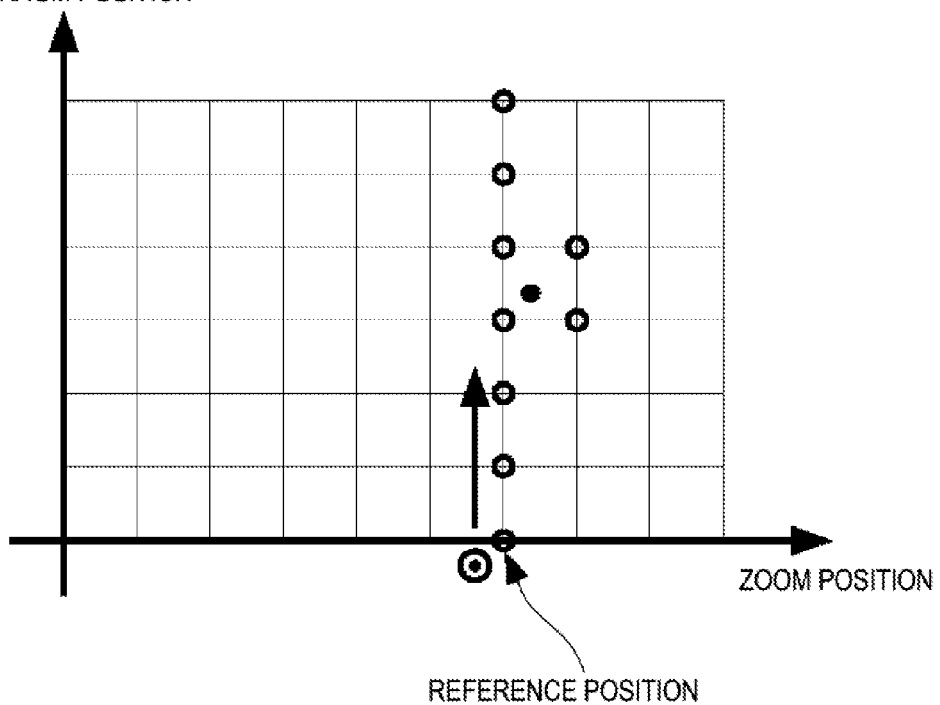
FIG. 8 is an explanatory view showing parameter positions calculated in one fixed zoom position.
Figure 9:
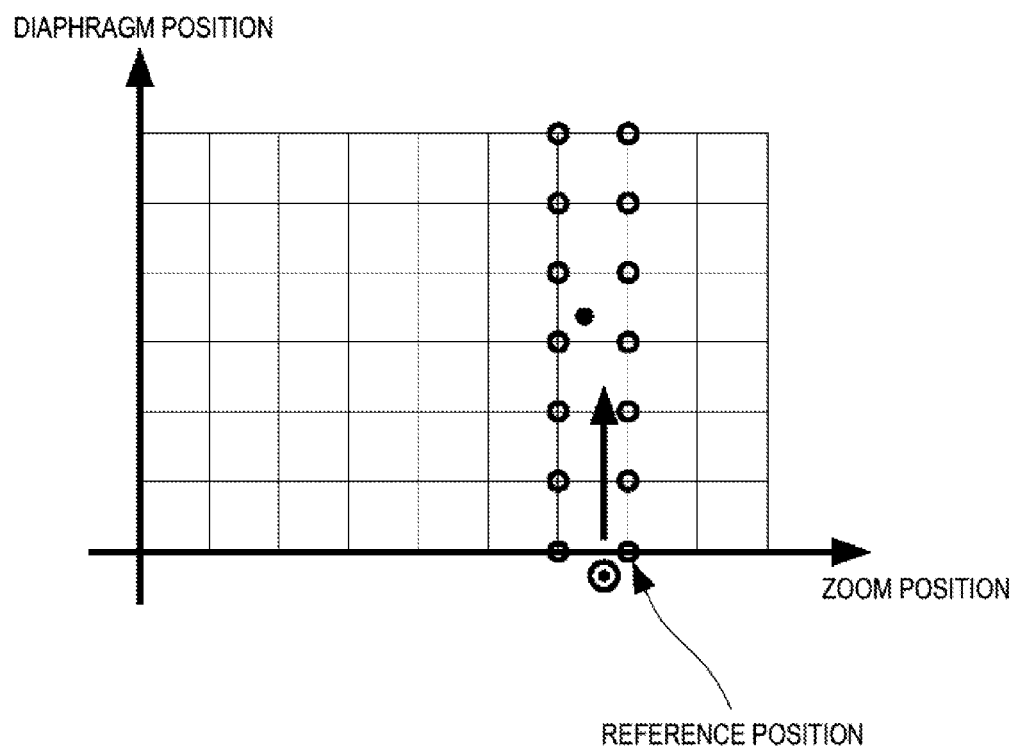
FIG. 9 is an explanatory view showing parameter positions calculated in the other fixed zoom position.
Figure 10:
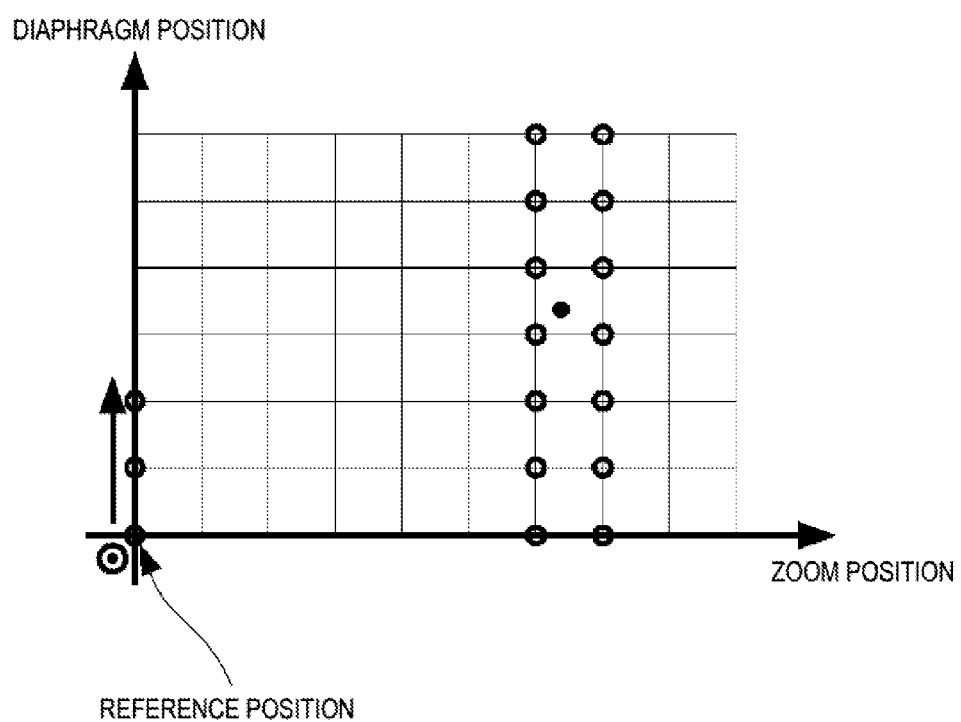
FIG. 10 is an explanatory view showing a procedure example of calculating remaining parameter positions.

Specifically, for example, the operation of fixing the zoom positions and the focus lens positions, sequentially calculating parameter positions in the diaphragm direction from the reference position, and then, calculating parameter positions by shifting the focus lens position by one grid is repeated. Accordingly, parameter positions in all directions of the diaphragm position and the focus lens position varying in the fixed zoom positions are calculated as shown in FIG. 8 (only parameter positions in the diaphragm direction are shown in FIG. 8). Next, the same operation is performed by shifting the zoom position by one grid, thereby calculating parameter positions in all directions of the diaphragm position and the focus lens position varying in the fixed zoom positions as shown in FIG. 9 (only parameter positions in the diaphragm direction are shown in FIG. 9). In the example shown in FIG. 8 and FIG. 9, the zoom position of the closest parameter position is fixed first, then, the zoom positions of close parameter positions adjacent in the zoom position direction are fixed, however, the order may be reversed.

Next, the body-side microcontroller 13 transmits parameter positions data of which has not been acquired in the parameter positions calculated as the above to the interchangeable lens unit 20 (Step S12).

When data of all parameter positions of diaphragm positions and focus lens positions calculated while fixing two points of zoom positions has been acquired in Step S11, the body-side microcontroller 13 determines whether all data has been acquired or not (Step S13). Here, when there is unacquired data, the body-side microcontroller 13 transmits all remaining parameter positions data of which has not been acquired to the interchangeable lens unit 20 (Step S14).

Data corresponding to parameter positions data of which has not been acquired is sequentially acquired from appropriate reference positions. In an example shown in FIG. 10, for example, reference positions of the diaphragm position and the focus lens position and a zoom reference position such as a wide angle are applied. In the case where unacquired data is acquired by applying these reference positions, first, all parameter positions in the directions of the diaphragm position and the focus lens position are calculated while fixing the zoom reference positions, then, the same processing is repeated by shifting the zoom position one by one. Naturally, these reference positions can be arbitrarily set, not taking one end of each variable range in the diaphragm position, the focus lens position and the zoom position.

Figure 11:
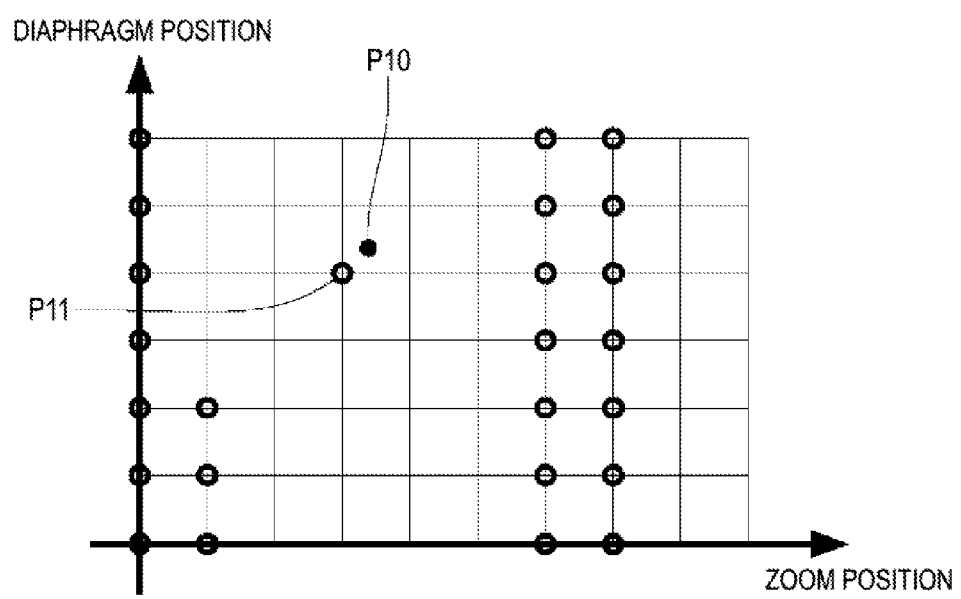
FIG. 11 is an explanatory view showing the present parameter position and the closest parameter position when the zoom position is moved.

Next, a case where the person taking an image moves the zoom position while acquiring lens characteristic data from the interchangeable lens unit 20 will be explained. Also in this case, data of a parameter position closest to parameter position information of a movement destination is acquired first. Accordingly, lens-side microcontroller 25 monitors the change of the zoom position (Step S15). Here, when the change of the zoom position is detected, the process proceeds to Step S1 and the lens-side microcontroller 25 transmits the present parameter position information to the camera body 10. In the camera body unit 10 which has received the present parameter position information, the body-side microcontroller 13 starts processing from the data acquisition of the closest parameter position. In the example of FIG. 11, assume that the parameter position of the movement destination is P10 and the closest parameter position at that time is a parameter position P11. In this case, the closest parameter position P11 is a parameter position data of which has not been acquired, the body-side microcontroller 13 starts processing from the data acquisition of the parameter position P11.

Figure 12:
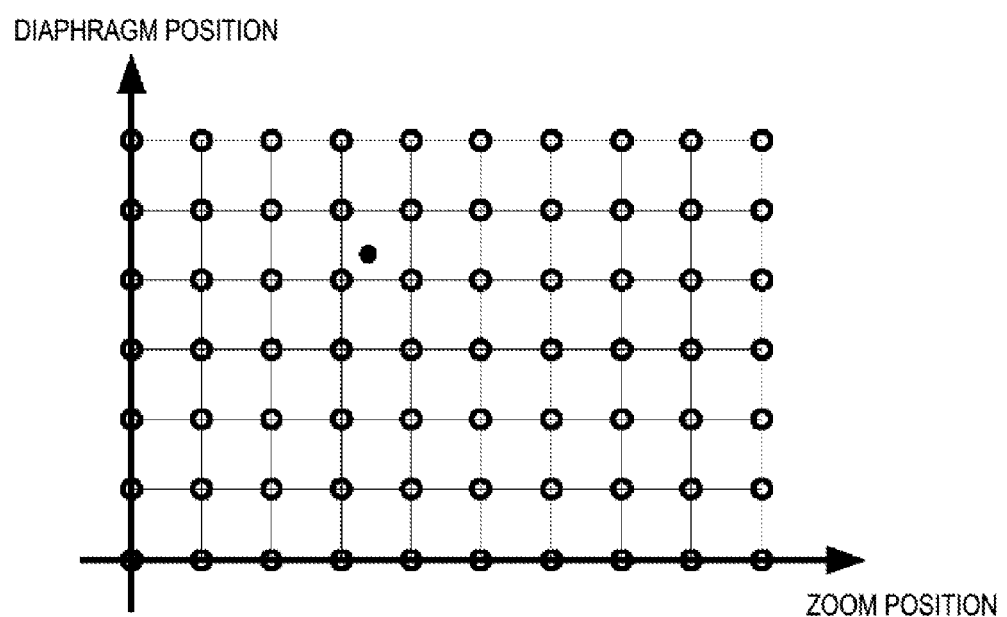
FIG. 12 is an explanatory view showing a state where all parameter positions are calculated.

When data of all parameter positions has been acquired in Step S13, the transmission processing of lens characteristic data ends and communication between the camera body unit 10 and the interchangeable lens unit 20 is completed. At this time, all parameter positions are filled with corresponding data as shown in FIG. 12, and the lens-interchangeable camera system is completely ready for imaging.

When using the lens-interchangeable camera system according to the embodiment of the present disclosure, the camera becomes ready to take an image before transmitting all lens characteristic data to the camera body unit 10, therefore, the camera becomes ready to take an image almost at the same time as the camera is activated.

As data of parameter positions of the diaphragm position and the focus lens position in the fixed zoom position is preferentially acquired, adequate correction data in exposure time can be obtained even in the system in which the diaphragm and focus positions suddenly change at the moment of pressing the shutter button.

It should be understood by those skilled in the art that various modifications, combinations, sub-combinations and alterations may occur depending on design requirements and other factors insofar as they are within the scope of the appended claims or the equivalents thereof.

What is claimed is:

1. A lens-interchangeable camera system comprising:
an interchangeable lens unit storing discrete values of lens characteristic data corresponding to a number of lens parameters; and
a camera body unit to which the lens characteristic data is transmitted from the interchangeable lens unit when the interchangeable lens unit is mounted,
wherein the camera body unit includes
an acquisition data storage unit storing the transmitted lens characteristic data,
a closest data acquisition processing unit receiving present parameter position information of the interchangeable lens unit, said present parameter position information being representative of a location in a coordinate system obtained from a current respective position of each of a number of lens parameters, calculating a respective parameter position of the discrete lens characteristic data which is closest to the present parameter position and requesting the interchangeable lens unit to acquire corresponding lens characteristic data,
a close data acquisition processing unit calculating a number of parameter positions each being a next closest to the closest parameter position and requesting the interchangeable lens unit to acquire corresponding lens characteristic data, and
an unacquired data acquisition processing unit calculating any parameter positions which have not been acquired or calculated and requesting the interchangeable lens unit to acquire corresponding lens characteristic data, and processing is performed in the order from the closest data acquisition processing unit, the close data acquisition processing unit and the unacquired data acquisition processing unit.

2. The lens-interchangeable camera system according to claim 1,
wherein the closest data acquisition processing unit determines whether the lens characteristic data corresponding to the calculated closest parameter position has been acquired or not and requesting the interchangeable lens unit to acquire the lens characteristic data corresponding to the closest parameter position only when the data has not been acquired.

3. The lens-interchangeable camera system according to claim 1, wherein the number of parameter positions is seven.

4. The lens-interchangeable camera system according to claim 1,
wherein the parameter position includes a zoom position, a diaphragm position and a focus lens position of the interchangeable lens unit.

5. The lens-interchangeable camera system according to claim 4,
wherein the unacquired data acquisition processing unit preferentially requests lens characteristic data of the entire area corresponding to diaphragm positions and focus lens positions relating to the close parameter positions adjacent in front and back in a zoom position direction sandwiching the present parameter position.

6. The lens-interchangeable camera system according to claim 5,
wherein the unacquired data acquisition processing unit performs calculation of the unacquired parameter positions sequentially from a parameter reference position which is arbitrarily set.

7. The lens-interchangeable camera system according to claim 1,
wherein the lens characteristic data includes lens aberration, exit pupil information and shading information.

8. The lens-interchangeable camera system according to claim 1,
wherein the lens characteristic data includes lens design information and optical information calculated from the lens design information.

9. A lens data transmission method comprising:
transmitting lens characteristic data for each of a number of lens positions each being next closest to a current lens position based on present lens position information notified by an interchangeable lens unit when transmitting the lens characteristic data of the interchangeable lens unit to a camera body unit after the interchangeable lens unit is mounted on the camera body unit,
said present lens position information being representative of a location in a coordinate system obtained from a current respective position of each of a number of lens parameters.

10. A non-transitory computer-readable storage medium having stored thereon a lens data acquisition program which when executed allows a computer to execute processing comprising:
receiving present parameter position information of an interchangeable lens unit, said present parameter position information being representative of a location in a coordinate system obtained from a current respective position of each of a number of lens parameters, calculating a respective parameter position of discrete lens characteristic data which is closest to the present parameter position and requesting the interchangeable lens unit to acquire corresponding lens characteristic data, calculating a number of parameter positions each being a next closest to the closest parameter position and requesting the interchangeable lens unit to acquire corresponding lens characteristic data, and calculating any parameter positions which have not been acquired or calculated and requesting the interchangeable lens unit to acquire corresponding lens characteristic data.

* * * * *